United States Patent [19]

Stuart

[11] Patent Number: 4,509,612

[45] Date of Patent: Apr. 9, 1985

[54] LATCH MECHANISM FOR A TILT-CAB TRUCK

[75] Inventor: Thomas G. Stuart, Mukwonago, Wis.

[73] Assignee: Applied Power Inc., Milwaukee, Wis.

[21] Appl. No.: 425,894

[22] Filed: Sep. 28, 1982

[51] Int. Cl.³ .............................................. B62D 33/06
[52] U.S. Cl. ................................. 180/89.14; 292/157
[58] Field of Search ..................... 180/89.14, 89.13; 296/35.1; 292/144, 156, 157, 174, 335

[56] References Cited

U.S. PATENT DOCUMENTS

| | | | |
|---|---|---|---|
| 2,323,674 | 7/1943 | Purkiss | 292/157 |
| 2,570,390 | 10/1951 | Schuldt | 292/335 |
| 2,939,541 | 6/1960 | Smalley | 180/89.15 |
| 3,819,225 | 6/1974 | Carlisle et al. | 180/89.14 |
| 3,859,908 | 1/1975 | Karls et al. | 292/157 |
| 3,973,793 | 8/1976 | Kirst, Jr. et al. | 292/144 |
| 4,090,731 | 5/1978 | Bopp et al. | 180/89.13 |
| 4,225,004 | 9/1980 | Lipshield | 180/89.14 |

FOREIGN PATENT DOCUMENTS 73971 6/1970 German Democratic Rep. .

Primary Examiner—Joseph F. Peters, Jr.
Assistant Examiner—Ross Weaver
Attorney, Agent, or Firm—John J. Byrne; Bradford E. Kile; Kevin M. O'Brien

[57] ABSTRACT

Disclosed is a latch mechanism for a tilt-cab truck including a latch pin and a latch locking assembly adapted to engage the latch pin. The latch locking assembly includes a housing, a sliding latch assembly disposed in the housing for sliding movement in a direction generally perpendicular to the motion of the latch pin, a spring which biases the sliding latch assembly into engagement with the latch pin, a hydraulically actuated piston which forces the sliding latch assembly out of engagement with the latch pin, and a latch locking member which releasably holds the sliding latch assembly out of engagement with the latch pin.

4 Claims, 7 Drawing Figures

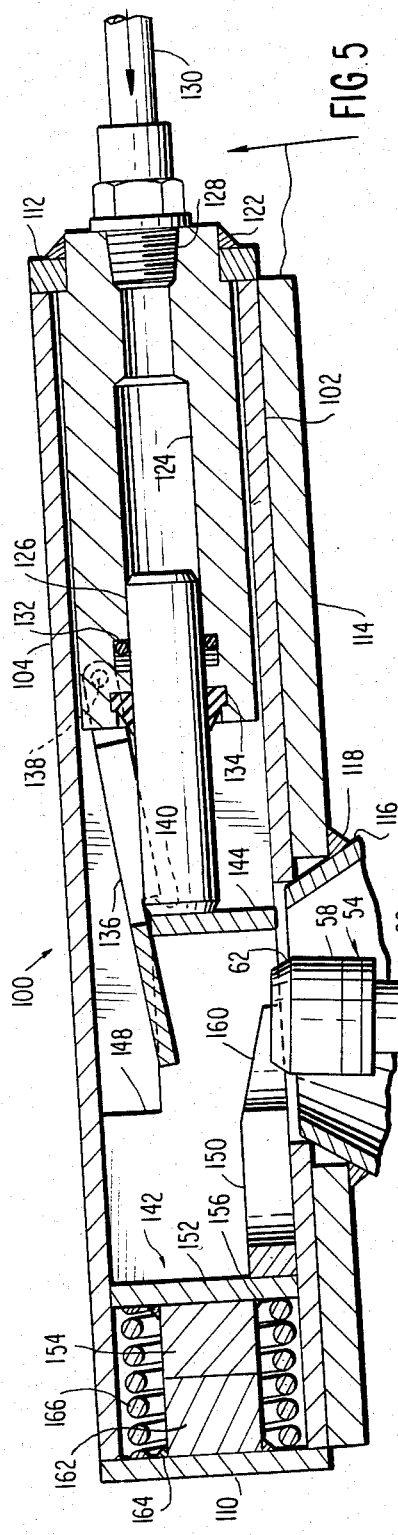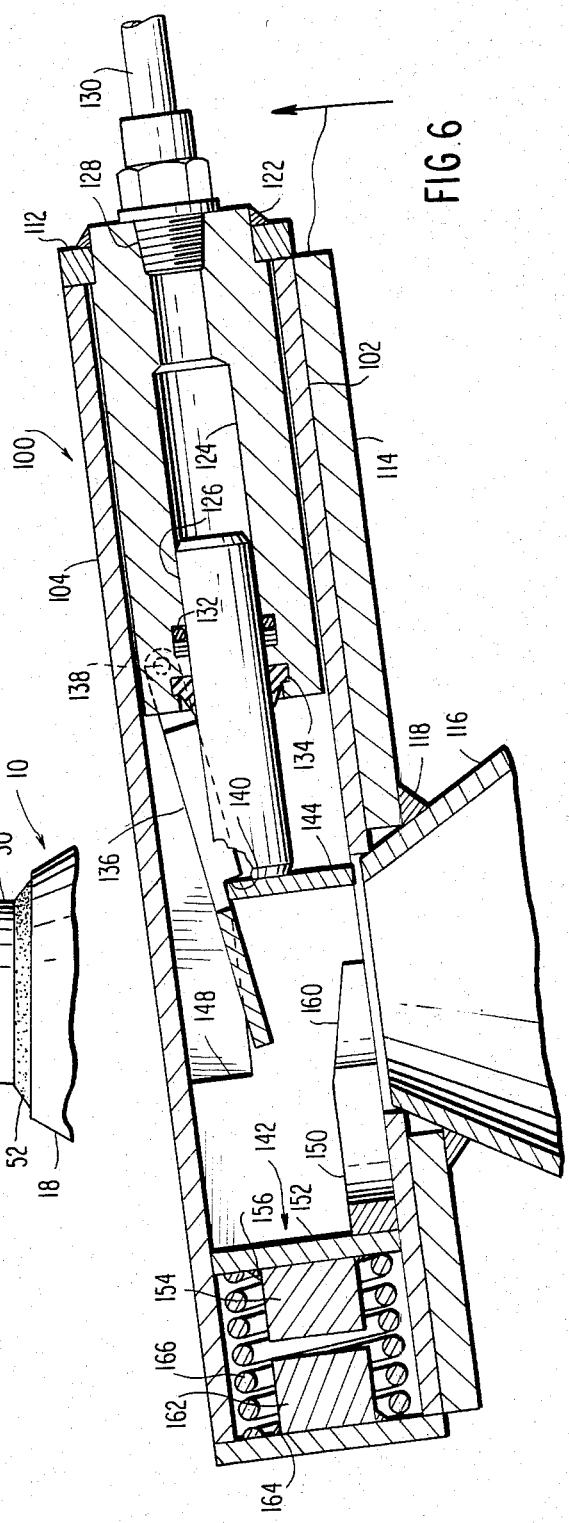

4,509,612

LATCH MECHANISM FOR A TILT-CAB TRUCK

TECHNICAL FIELD

This invention relates to a cab latch mechanism for tilt-cab trucks.

BRIEF SUMMARY OF THE INVENTION

A cab latch mechanism according to the present invention includes a latch pin and a latch locking assembly adapted to engage the latch pin. The latch locking assembly includes a housing, a sliding latch assembly disposed in the housing for sliding movement in a direction generally perpendicular to the motion of the latch pin, a spring which biases the sliding latch assembly into engagement with the latch pin, a hydraulically actuated piston which forces the sliding latch assembly out of engagement with the latch pin, and a latch locking member which releasably holds the sliding latch assembly out of engagement with the latch pin.

Particular features of this mechanism includes its low overall height and the fact that it locks open mechanically. When the hydraulically actuated piston opens the latch, allowing the cab to tilt, the latch mechanically locks open until physically tripped to unlock the mechanism, allowing the latch to close. This lock-open feature prevents any premature closing of the latch. Until the latch is in the proper position for closing and locking the cab to the chassis, the latch remains open.

BRIEF DESCRIPTION OF THE DRAWINGS

FIG. 4 is a side sectional view of the apparatus shown in FIGS. 1-3 after the sliding latch assembly has been moved out of engagement with the latch pin.

FIG. 5 is a side sectional view of the apparatus shown in FIGS. 1-3 as the latch locking assembly is being lifted off the latch pin.

FIG. 6 is a side sectional view of the latch locking assembly after it has been lifted clear of the latch pin and the hydraulic pressure on the piston has been released.

DETAILED DESCRIPTION OF THE PRESENTLY PREFERRED EMBODIMENT

Structure of the Latch Pin Assembly

Figure 1:
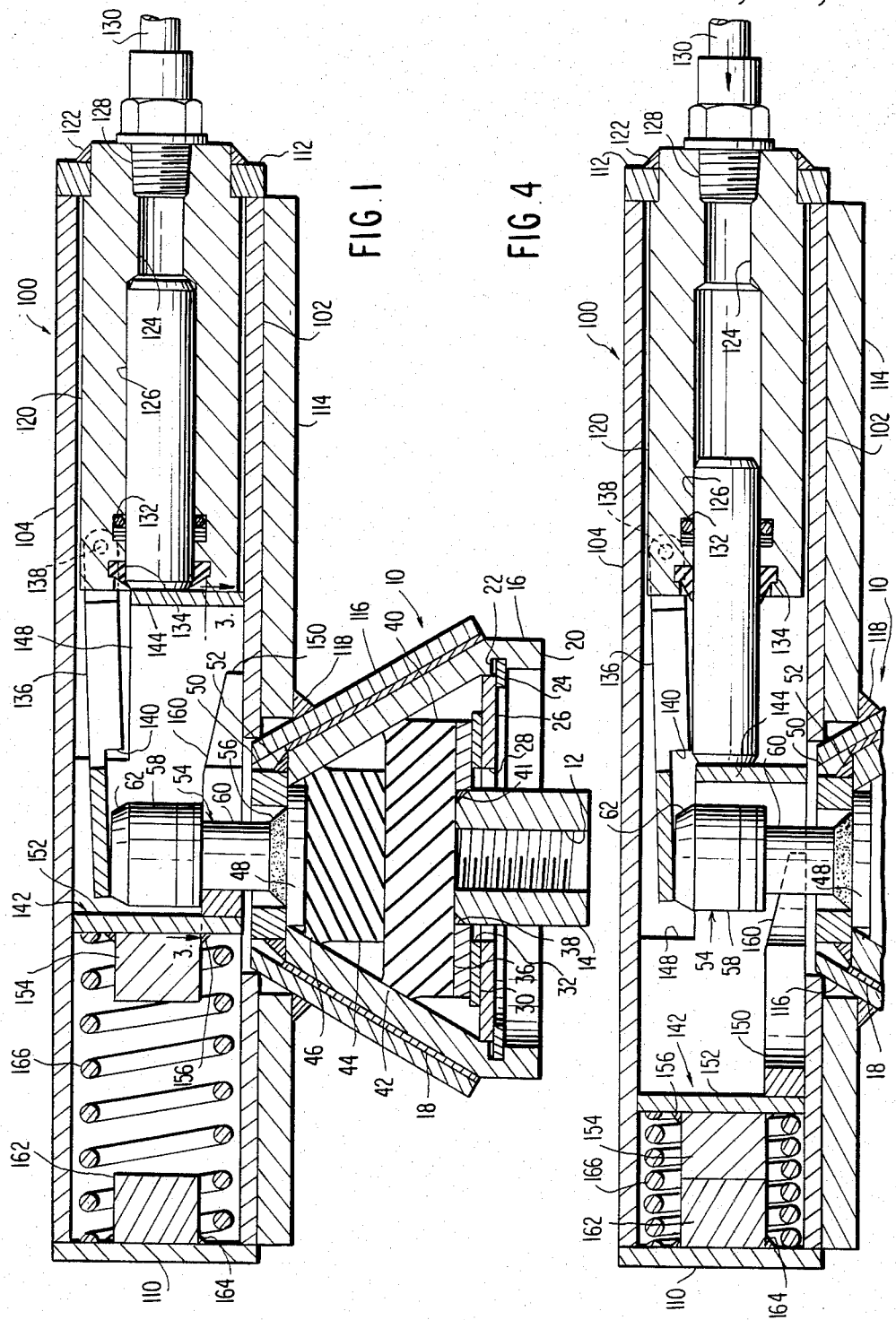
FIG. 1 is a side sectional view of the presently preferred embodiment of the invention in the locked, or over-the-road, position.

The latch pin assembly 10 is preferably secured to the cab chassis by means of a threaded hole 12 in a mounting cylinder 14. The threaded hole 12 receives a bolt (not shown) projecting upwardly from the cab chassis. Since the latch pin assembly 10 is axially symmetric, the angular position of the mounting cylinder 14 relative to the bolt is irrelevant.

A metallic housing 16 generally in the shape of a hollow truncated cone surrounds the mounting cylinder 14. A resilient layer 18 of rubber, plastic, or the like is placed over the conical outer surface of the housing 16 to serve as a wear surface. The lower portion of the housing 16 ends in a cylindrical skirt 20 the inner surface of which contains an annular slot 22. The annular slot receives a snap ring 24 which serves as a mounting platform for additional structure. Since the outer diameter of the snap ring 24 excedes the inner diameter of the cylindrical skirt 20, a spring washer which can be distorted inwardly while being snapped into place is used.

A first flat, cylindrical mounting plate 26 is supported on the snap ring 24. The outer diameter of the mounting plate 26 is equal to the inner diameter of the cylindrical skirt 20, and the thicknesses of the snap ring 24 and the mounting plate 26 and the location of the axial slot 22 are such that the upper, outer edge of the mounting plate 26 fits into the angle where the inner surface of the housing 16 changes from cylindrical to conical shape. The mounting plate 26 contains a central hole 28 the diameter of which is well in excess of the outer diameter of the mounting cylinder 14.

A second, flat, cylindrical elastimeric mounting plate 30 is supported on the first mounting plate 26. The mounting plate 30 contains a central hole 32 the diameter of which is equal to the diameter of the central hole 28. The outer diameter of the mounting plate 30 is less than the outer diameter of the mounting plate 26, and the mounting plate 30 does not contact the inner surface of the housing 16.

A third flat, cylindrical mounting plate 36 is positioned above the mounting plate 30. It contains a central hole 38 equal in diameter to the outer diameter of the mounting cylinder 14, to which the mounting plate 36 is welded. Thus, the assembly consisting of the mounting cylinder 14 and the mounting plate 36 radially positions the ring 34 and the mounting plate 30.

A first generally cylindrical elastimeric mounting block 40 is compressed (pre-loaded) between the assembly consisting of the mounting cylinder 14 and the mounting plate 36 and a second generally cylindrical elastimeric mounting block 44. The upper, outer surface 42 of the mounting block 40 is distorted by the pre-load force to correspond to the inner surface of the housing 16.

Similarly, elastimeric mounting block 44 is preloaded between a third generally cylindrical mounting block 48 and the elastimeric mounting block 40.

The upper outer surface 46 of the mounting block 44 is also distorted by the pre-load force to correspond to the inner surface of the housing 16. Additionally, the elastimeric mounting blocks 40 and 44 allow welded assemblies 14, 36 and 54, 48 to be flexible.

The mounting block 48 is centrally mounted on the upper surface of the mounting block 44. The outer diameter of the mounting block 48 is equal to the inner diameter of the top opening of the housing 16, and the axial dimensions of the various parts are such that the upper surface of the mounting block 48 and the upper surface of the housing 16 are coplanar.

A ring 50 is welded to the upper surface of the housing 16 at 52. The outer diameter of the ring 50 is greater than the inner diameter of the top opening of the housing 16, but the inner diameter of the ring 50 is less than the inner diameter of the top opening of the housing 16, so the bottom surface of the ring 50 projects inwardly beyond the housing 16 and serves as a stop for the upper surface of the mounting block 48.

A cylindrical latch pin 54 is centrally welded at 56 to the upper surface of the mounting block 48. The latch pin 54 has a head 58 which is larger in diameter than its shaft 60, and the upper outward surface 62 of the head 58 is chamferred to act as a guide surface when the latch pin 54 enters the latch locking assembly 100, described hereinafter.

Structure of the Latch Locking Assembly

The latch locking assembly 100 is preferably secured to the tilting cab, although it would be possible to reverse the position of the latch pin assembly 10 and the latch locking assembly 100. The latch locking assembly 100 is, of course, positioned to receive and releasably grasp the latch pin 54 when the tilting cab is in its down position.

Figure 2:
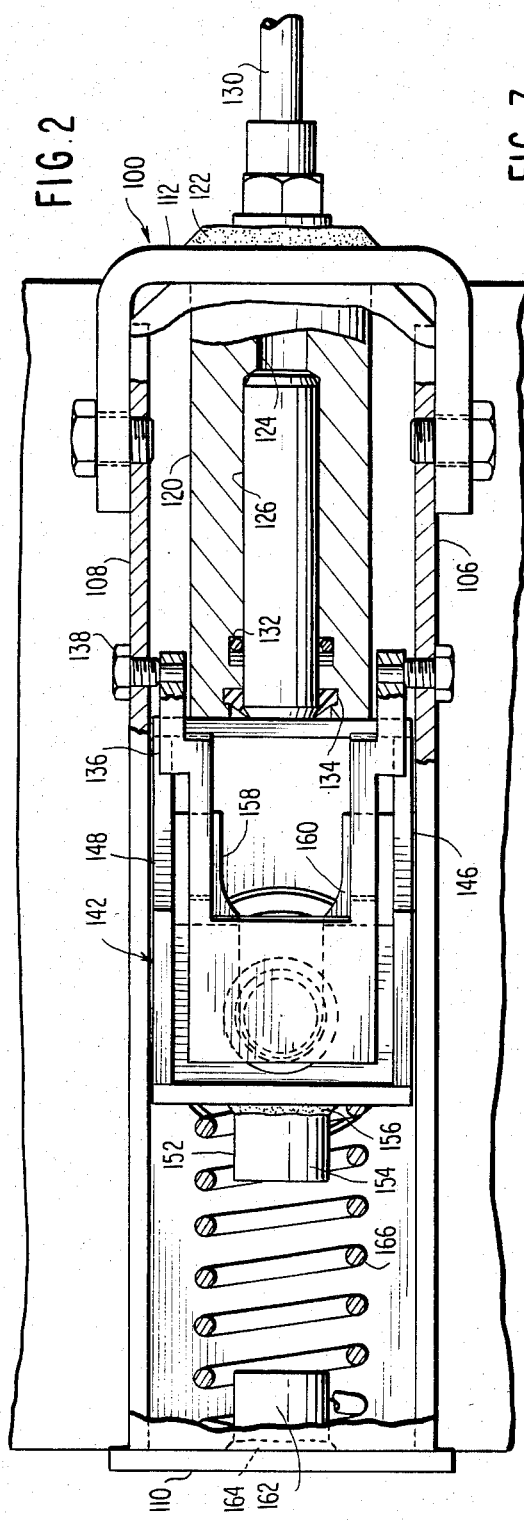
FIG. 2 is a top view of FIG. 1 with the top plate broken away except at the extreme right.

The latch locking assembly 100 has a lower wall plate 102, an upper wall plate 104, side wall plates 106 and 108, a planar end plate 110 at one end, and a U-shaped end plate 112 bolted to the side wall plates 106 and 108 to the other end. As shown in FIG. 2, the upper wall plate 104 and the lower wall plate 102 are chamferred at the corners adjacent the U-shaped end plate 112 to avoid contact with the inner radii of the end plate 112.

A mounting plate 114 is secured to the lower wall plate 102, and a guide 116 in the form of a hollow truncated cone is welded to the mounting plate 114 at 118 and received in appropriately sized and placed holes in the lower wall plate 102 and the mounting plate 114. As best seen in FIG. 1, the inner surface of the guide 116 and the outer surface of the housing 16 are sized and shaped to nest when the latch pin assembly 10 and the latch locking assembly 100 are in the latched condition.

A piston housing 120 is disposed in the interior of the latch locking assembly 100 and extends through and is welded to the end plate 112 at 122. A stepped bore 124 is provided in the piston housing 120, and a piston 126 is slidably received in the larger diameter portion of the stepped bore 124. The stepped bore 124 extends to the exterior of the piston housing 120 in both directions, and a threaded fitting 128 is provided in the piston housing 120 for connection via a conduit 130 to a source of hydraulic fluid under pressure. Interior packing 132 is provided to prevent loss of hydraulic fluid through the annular volume between the piston 126 and the inner surface of the bore 124, and a wiper seal 134 is provided at the interior opening of the bore 124 to prevent the piston 126 from bringing contaminents back into the bore 124 when it is retracted.

A latch locking plate 136 is pivotably mounted on axles 138 which extend through and are threadedly received in the side wall plates 106 and 108. The latch locking plate 136 tends to pivot downwardly (or counterclockwise in the side views) due to the force of gravity, and it is pushed upwardly (or clockwise in the side views) by the latch pin 54. The latch locking plate 136 has a shoulder 140 the function of which is explained hereinafter.

A sliding latch assembly 142 is disposed in the interior of the latch lock assembly 100 to the left of the piston housing 120 in the drawings. The sliding latch assembly 142 has a right-hand end wall 144, two side walls 146 and 148 which slide along the interior surfaces of the side wall plates 106 and 108 respectively, a bottom plate 150 which slides along the lower wall plate 102, a left-hand end wall 152, and right-hand stop 154 welded to the left-hand surface of the end wall 152 at 156. The left-hand end wall 152 slides along both the lower wall plates 102 and the upper wall plate 104, bu the right-hand end wall 144 only slides along the lower wall plate 102, stopping short of the upper wall plate 104 in order to permit the latch locking plate 136 to extend into the interior of the sliding latch assembly 142.

Figure 3:
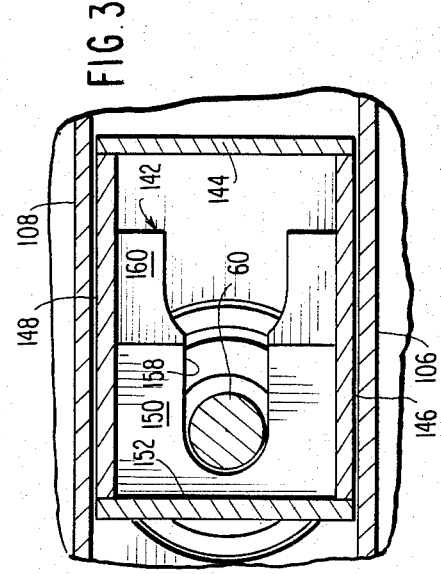
FIG. 3 is a view along the line 3—3 in FIG. 1.

As best seen in FIG. 3, the bottom plate 150 has a slot 158 which receives the shift 60 of the latch pin 54. The left-hand end of the slot 158 is narrower than the head 58 of the latch pin 54 to permit securement of the latch pin 54, and the right-hand end of the slot 158 is wider than the head 58 of the latch pin 54 to permit the latch pin 54 to move out of engagement with the latch locking assembly 100. Although the slot 158 is shown as open at the right, that is only for ease of fabrication. In principal, the slot 158 could be closed at both ends.

As best seen in FIG. 3, the bottom plate 150 is generally U-shaped in plan, and the legs of the "U" have a ramp surface 160 which engages the lower surface of the head 58 of the latch pin 54 as the sliding latch assembly 142 moves back into engagement with the latch pin 54.

A left-hand stop 162 is welded to the end wall 110 at 164, and a spring 166 is concentrically disposed over the stops 154 and 162 and bottomed against the end walls 110 and 152, biasing the sliding latch assembly 142 towards the right in the drawings.

Operation of the Mechanism

When a tilt-cab truck using the subject latch mechanism is in the cab-down, over-the-road condition, the latch mechanism is in the condition shown in FIGS. 1-3. In this condition, the hydraulic fluid in the stepped base 124 is not under pressure, the spring 166 has forced the sliding latch assembly 142 to the right, and the sliding latch assembly 142 in turn has pushed the piston 126 to the right until it has seated against the step in the stepped bore 124. The head 58 of the latch pin 54 is held in the left-hand, smaller width portion of the slot 158, securing the latch locking assembly 100 (and thus the tilting cab) to the latch pin assembly 10 (and thus to the cab chassis). Finally, the latch locking plate 136 has been forced to its upper, or clockwise position by the latch pin 54. Although the latch locking plate 136 may pivot freely a few degrees more around the axles 138 until it comes into contact with the inner surface of the upper wall plate 104, it always returns to its rest position in contact with the latch pin 54 due to the force of gravity.

When it is desired to tilt the cab, hydraulic pressure is applied to the smaller diameter portion of the stepped bore 124 via the conduit 130 before the tilting motion is begun, as indicated by the arrow in FIG. 4. That pressure acts against the end of the piston 126 seated against the step in the stepped bore 124, causing the piston 126 to move to the left. The leftward motion of the piston 126 in turn forces the sliding latch assembly 142 to the left against the urging of the spring 166 until the step 154 comes to rest against the step 162, preventing further leftward movement. At that point, the head 58 of the latch pin 54 is in and/or to the right of the wider width portion of the slot 158, which means that the latch locking assembly 100 (and thus the tilting cab) is no longer secured to the latch pin assembly 10 (and thus to the cab chassis). During this movement, the latch locking plate 136 and the latch pin 54 have not moved.

Next, movement of the tilting cab away from the cab chassis is initiated, as shown in FIG. 5. At this stage, hydraulic pressure is still being applied to the stepped bore 124, keeping the piston 126 and thus the sliding-latch assembly 142 in the far left-hand positions. However, as the latch locking-assembly 100 moves away from the latch pin assembly 10, the head 58 of the latch pin 54 no longer supports the latch locking plate 136, and it drops downward (i.e., it pivots in a counterclockwise direction around the axles 138) until it is supported by the right-hand end wall 144 of the sliding-latch assembly 142.

Figure 7:
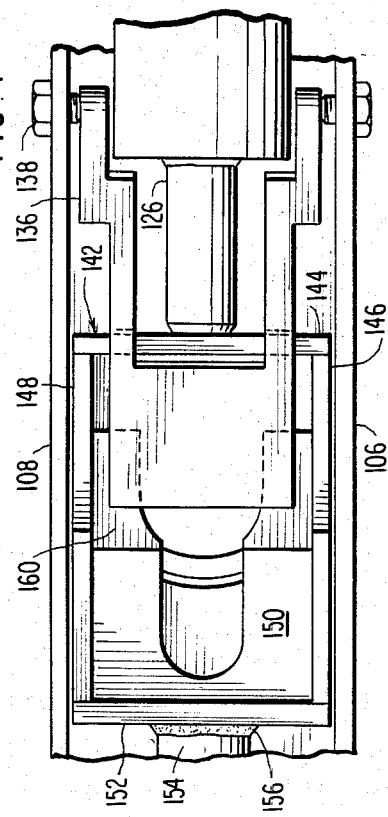
FIG. 7 is a fragmentary top view of FIG. 6 with the top plate broken away.

Next, as illustrated in FIGS. 6 and 7, the hydraulic pressure in the stepped bore 124 is released, allowing the spring 166 to force the sliding latch assembly 142 to the right, pivoting the latch locking plate 136 in the clockwise direction, until the right-hand end wall 144 of the sliding latch assembly 142 comes to rest against the shoulder 140, which prevents further sliding movement of the sliding latch assembly 142 to the right. At this point, the piston 126 can move freely in the stepped bore 124 between extremes defined by the end wall 144 and the step in the stepped bore 124.

When the tilting cab is returning to its cab-down, over-the-road condition, the guide 116 accepts the latch pin 54, and the head 58 of the latch pin 54 comes into contact with the latch locking plate 136, forcing it upwardly (i.e., in the clockwise direction about the axles 138) and forcing the sliding latch assembly 142 slightly to the left until the shoulder 140 clears the right-hand end wall of the sliding latch assembly 142. At that point, the spring 166 forces the sliding latch assembly 142 to the right, and the head 58 of the latch pin 54 rides up the ramp 160 until the mechanism returns to the condition shown in FIGS. 1-3.

Although not shown in the drawings, the sliding latch assembly 142 preferably carries an indicator which protrudes through one of the lateral walls of the latch locking assembly to provide a visual indication of whether the latch locking components are in their open or closed position. Additionally, a manual re-cocking handle can be provided to permit the sliding latch assembly 142 to be slid to the left to relock the mechanism in the event that the shoulder 140 is inadvertently jarred loose from the right-hand end wall 142, permitting the sliding latch assembly 142 to move to the right under the urgings of the spring 166.

Caveat

While the present invention has been illustrated by a detailed description of a preferred embodiment thereof, it will be obvious to those skilled in the art that various change in form and detail can be made therein without departing from the true scope of the invention. For that reason, the invention must be measured by the claims appended hereto and not by the foregoing preferred embodiment.

I claim:

1. A latch mechanism for a tilt-cab truck, said latch mechanism comprising:
   a latch pin adapted for mounting on a tilting cab or on a cab chassis, said latch pin having a generally cylindrical shaft portion and a head portion connected at one end of said shaft portion, said head portion being larger in diameter than said shaft portion; and
   a latch locking assembly adapted for mounting on the other of said tilting cab or said cab chassis in position to engage said latch pin, said latch locking assembly having
      a housing with a top section, a bottom section and two side sections,
      a sliding latch arrangement disposed in said housing for sliding movement in a direction generally perpendicular to the motion of said latch pin as it moves into and out of engagement with said latch locking assembly, said sliding latch arrangement comprising
         two side walls slidingly and guidingly received within said side sections of said housing;
         a bottom plate connected to said side walls, said bottom plate having a first slotted section of sufficient size to receive said shaft portion of said latch pin and a second slotted section of sufficient size to receive said head portion of said latch pin; and
         a first end wall and a second end wall,
      a compression spring positioned against said first end wall of said sliding latch arrangement and biasing said sliding latch assembly in a first direction toward a position of engagement with said latch pin;
      a piston housing positioned within said housing of said latch locking assembly and having a piston bore,
      a piston disposed within said piston bore of said piston housing, said piston being hydraulically actuated so that upon introduction of hydraulic pressure into said piston bore said piston contacts said second end wall of said slding latch arrangement and moves said sliding latch arrangement in a second direction opposite to said first direction to disengage said sliding latch arrangement from said latch pin when it is desired to move said latch pin and said latch locking assembly apart from each other; and
      a latch locking plate pivotally secured to said side sections of said housing of said latch locking assembly and disposed within said housing to engage said second end wall of said sliding latch arrangement when said sliding latch assembly has moved sufficiently in said second direction to permit separation of said latch pin from said latch locking assembly and to hold said sliding latch assembly against the urging of said compression spring in a position in which said sliding latch arrangement cannot engage said latch pin after removal of hydraulic pressure from said piston bore until said latch locking plate is separated from said second end wall by said latch pin, whereupon said compression spring returns said sliding latch assembly into engagement with said latch pin.

2. A latch mechanism as recited in claim 1 wherein said latch locking member pivots down to engage said sliding latch assembly due to the force of gravity and is pivoted up to release said sliding latch assembly by contact with said latch pin.

3. The latch mechanism of claim 1 further characterized in that:
   one end of said head portion of said latch pin is chamferred and serves a guiding surface when said latch pin is to be engaged by said latch locking assembly.

4. The latch mechanism of claim 1 further characterized in that:
   said bottom plate of said sliding latch arrangement is generally U-shaped with the legs of the "U" being ramped to slidingly contact a lower surface of said head portion of said latch pin when said sliding latch arrangement engages latch pin.

* * * * *